US012398953B2

(12) United States Patent
Strongrich et al.

(10) Patent No.: US 12,398,953 B2
(45) Date of Patent: Aug. 26, 2025

(54) RAPID DEPRESSURIZATION CONTROLLED ICE NUCLEATION IN PHARMACEUTICAL FREEZE-DRYING

(71) Applicants: Purdue Research Foundation, West Lafayette, IN (US); Genentech, Inc., South San Francisco, CA (US)

(72) Inventors: Andrew Strongrich, West Lafayette, IN (US); Alina Alexeenko, West Lafayette, IN (US); Fredric John Lim, Fremont, CA (US); Lokesh Kumar, San Mateo, CA (US)

(73) Assignees: Purdue Research Foundation, West Lafayette, IN (US); Genentech, Inc., South San Francisco, CA (US)

( * ) Notice: Subject to any disclaimer, the term of this patent is extended or adjusted under 35 U.S.C. 154(b) by 715 days.

(21) Appl. No.: 17/832,372

(22) Filed: Jun. 3, 2022

(65) Prior Publication Data

US 2022/0397346 A1 Dec. 15, 2022

Related U.S. Application Data

(60) Provisional application No. 63/196,654, filed on Jun. 3, 2021.

(51) Int. Cl.
*F26B 5/06* (2006.01)

(52) U.S. Cl.
CPC .................................... *F26B 5/06* (2013.01)

(58) Field of Classification Search
CPC ........................................................ F26B 5/06
USPC ..................................................... 34/298, 92
See application file for complete search history.

(56) References Cited

U.S. PATENT DOCUMENTS 2,853,797 A * 9/1958 Graham .................. C12N 1/04 435/256.8
3,964,174 A * 6/1976 King .................... F26B 21/083 34/287
6,971,187 B1 12/2005 Pikal et al.
7,024,796 B2 * 4/2006 Carin ................... F26B 23/001 34/514

(Continued)

FOREIGN PATENT DOCUMENTS

JP 2003161575 A * 6/2003

OTHER PUBLICATIONS

Milton et al., Evaluation of Manometric Temperature Measurement as a Method of Monitoring Product Temperature During Lyophilization, PDA J Pharm Sci and Tech 1997, 51 7-16.

(Continued)

*Primary Examiner* — Stephen M Gravini
(74) *Attorney, Agent, or Firm* — Piroozi-IP, LLC

(57) ABSTRACT

A lyophilization method for lyophilizing products inside one or more vials within a lyophilization chamber is disclosed which includes humidifying a charge gas to a predetermined relative humidity, cooling shelves in the lyophilization chamber to a predetermined temperature, pressurizing the chamber with the humidified charge gas to a pressurization threshold to thereby achieving a target relative humidity level within the lyophilization chamber, and suddenly releasing pressure within the lyophilization chamber until a depressurization threshold is reached in a short time interval up to about 4 seconds, during the depressurization, product inside one or more vials nucleate.

20 Claims, 12 Drawing Sheets

(56) References Cited

U.S. PATENT DOCUMENTS

| | | | | |
|---|---|---|---|---|
| 8,516,714 | B2 * | 8/2013 | Biemans | A61K 9/19 62/50.7 |
| 9,278,790 | B2 * | 3/2016 | McPherson | B65D 51/241 |
| 9,453,675 | B2 | 9/2016 | Gasteyer, III et al. | |
| 11,047,620 | B2 * | 6/2021 | Beutler | F26B 21/003 |
| 11,105,555 | B2 * | 8/2021 | Matsumoto | A23B 2/97 |
| 11,828,535 | B2 * | 11/2023 | De Beer | F26B 5/044 |
| 11,874,060 | B2 * | 1/2024 | Lennon-Meyer | F26B 11/04 |
| 12,085,337 | B2 * | 9/2024 | Mackay | F26B 5/044 |
| 12,109,311 | B2 * | 10/2024 | Slocum | A61K 9/19 |
| 2008/0224634 | A1 | 9/2008 | Scilia | |
| 2018/0036695 | A1 | 2/2018 | Karatsinides | |
| 2018/0274986 | A1 | 9/2018 | Ganguly et al. | |
| 2018/0306763 | A1 | 10/2018 | Brucker et al. | |
| 2019/0390903 | A1 | 12/2019 | Knight | |
| 2020/0340743 | A1 | 10/2020 | Strongrich et al. | |
| 2022/0397346 | A1 * | 12/2022 | Strongrich | F26B 5/044 |
| 2025/0109905 | A1 * | 4/2025 | Tang | A61K 39/39591 |

OTHER PUBLICATIONS

Zhang et al., Distribution of Vapor Pressure in the Vacuum Freeze-Drying Equipment, Mathematical Problems in Engineering, vol. 2012, Article ID 921254, 10 pages, 2012.

Massey, Heat and Mass Transfer in Semi-Porous Channels With Application to Freeze-Drying, Iht. J. Heat Mass Transfer. vol. 15, pp. 493-502, 1972.

Rasetto et al., Model based-monitoring of a non-uniform batch in a freeze-drying process, 18th European Symposium on Computer Aided Process Engineering, 2008.

Rasetto et al., On the Use of a Dual-Scale Model to Improve Understanding of a Pharmaceutical Freeze-Drying Process, Journal of Pharmaceutical Sciences, vol. 99, No. 10, Oct. 2010.

Zhu et al., Predictive models of lyophilization process for development, scale-up/tech transfer and manufacturing, European Journal of Pharmaceutics and Biopharmaceutics 128, 363-378, 2018.

Fissore et al., Process analytical technology for monitoring pharmaceuticals freeze-drying—A comprehensive review, Drying Technology,2018, vol. 36, No. 15, 1839-1865.

Ganguly et al., Spatial Variation of Pressure in the Lyophilization Product Chamber Part 1: Computational Modeling, AAPS PharmSciTech, vol. 18, No. 3, Apr. 2017.

Sane et al., Spatial Variation of Pressure in the Lyophilization Product Chamber Part 2: Experimental Measurements and Implications for Scale-up and Batch Uniformity, AAPS PharmSciTech, vol. 18, No. 2, Feb. 2017.

Barresi et al., Use of computational fluid dynamics for improving freeze-dryers design and process understanding. Part 1: Modelling the lyophilisation chamber, European Journal of Pharmaceutics and Biopharmaceutics 129 (2018) 30-44.

ISR for PCT/US2021/58356, Feb. 2022.

ISR for PCT/US2021/58604, Feb. 2022.

Jiang et al., Multi-Point Wireless Temperature Sensing System for Monitoring Pharmaceutical Lyophilization. Front. Chem, vol. 6, Article 288, Jul. 17, 2018.

Oddone et al., Non-Invasive Temperature Monitoring in Freeze Drying: Control of Freezing as a Case Study, Drying Technology, 33: 1621-1630, Aug. 31, 2015.

Sensirion, Application Note Dew-point Calculation, www.sensirion.com/humidity, Oct. 3, 2006.

* cited by examiner

List of Variables/Parameters

| Variable/Parameter | Description |
|---|---|
| P | Pressure |
| T | Temperature |
| V | Chamber Volume |
| A | Cross Sectional Area |
| γ | Specific Heat Ratio |
| $\mathcal{M}$ | Molecular Mass |

List of Subscripts

| Subscript | Description |
|---|---|
| c | Chamber |
| 0 | Stagnation |
| e | Exit (Ambient) |

RAPID DEPRESSURIZATION CONTROLLED ICE NUCLEATION IN PHARMACEUTICAL FREEZE-DRYING

CROSS-REFERENCE TO RELATED APPLICATIONS

The present patent application is related to and claims the priority benefit of U.S. Provisional Patent Application Ser. No. 63/196,654 filed Jun. 3, 2021, the contents of which are hereby incorporated by reference in its entirety into the present disclosure.

STATEMENT REGARDING GOVERNMENT FUNDING

None.

TECHNICAL FIELD

The present disclosure generally relates to a lyophilization process, and in particular, to improving a lyophilization process involving a rapid depressurization controlled ice nucleation in pharmaceutical freeze-drying process utilizing ballast gas.

BACKGROUND

This section introduces aspects that may help facilitate a better understanding of the disclosure. Accordingly, these statements are to be read in this light and are not to be understood as admissions about what is or is not prior art.

Freezing is a critical phase of the pharmaceutical freeze-drying/lyophilization process due to its influence on drying times, batch homogeneity, reconstitution time and possible degradation in protein formulations. A typical freezing process takes place in four discrete stages: supercooling, primary ice nucleation, secondary ice nucleation, and solidification. During supercooling, the temperature of the sample is reduced below its equilibrium freezing temperature into a metastable state where ice-like nuclei repeatedly form, agglomerate, and dissolve. As the temperature is lowered the density and size of these particles increases until a sufficient number coalesce to form a thermodynamically stable ice crystal. The emergence of this seed particle is referred to as primary nucleation and is stochastic in nature. Secondary ice nucleation is marked by the continued growth of the seed crystal and leads to a rapid rise in temperature of the bulk liquid to the equilibrium freezing point due to the release of latent heat at the liquid-ice interface. The rate of growth is on the order of a few cm/s and the direction is against the thermal gradient at the interface of the solid and liquid phases. The degree of bulk crystallization during secondary nucleation is directly related to the degree of supercooling. Higher supercooling offsets the latent heat for a longer period of time and allows a larger portion of the formulation to crystallize before reaching the equilibrium freezing temperature. When the equilibrium freezing point is reached the energy release from crystallization balances the heat transfer out of the solution and the system transitions to the much slower solidification process. Crystal growth in this phase is once again against the direction of the temperature gradient and heat is transported through the previously frozen ice structure and bottom of the vial into the shelf. Both solidification and secondary nucleation contribute significantly to the cake morphology and their relative contributions are largely dependent on the nucleation temperature.

The stochastic nature of the primary nucleation event leads to inconsistent nucleation temperatures within the batch. This behavior ultimately generates heterogeneity in drying characteristics among the vials. Products have been shown to undergo primary ice nucleation at temperatures of −20° C. in a laboratory environment and potentially as low as −30° C. at the manufacturing scale under standard ramped shelf freezing practices. The high density of ice-like clusters at these low temperatures leads to many small nuclei distributed throughout the liquid solution during primary nucleation. These ice crystals rapidly grow into interconnected needle-like crystal filaments, producing low-conductance passages through which sublimed water vapor eventually flows. The characteristics of this morphology can be predicted. However, in most cases, small pores are unfavorable as they drive up primary drying time and increases frozen layer temperature. Some benefit is derived from the higher surface area during secondary drying in the form of lower residual moisture content but this typically does not offset the performance gains in primary drying and can be typically accounted for by increasing the secondary drying temperature. Rapid freezing associated with deep supercooling has also been shown to place unwanted stresses on the product, potentially leading to protein denaturation, aggregation, pH shifts, and phase separation. In many cases the issue of small pore size can be rectified by annealing but this step comes at the cost of additional processing time.

Therefore, there is an unmet need for a novel approach to produce a cake morphology more favorable for lyophilization which results in nucleation induced simultaneously in all vials at a low degree of supercooling where crystals assume a form with a larger cross section and greater conductance.

SUMMARY

A lyophilization method for lyophilizing products inside one or more vials within a lyophilization chamber is disclosed. The method includes humidifying a charge gas to a predetermined relative humidity, cooling shelves in the lyophilization chamber to a predetermined temperature, pressurizing the chamber with the humidified charge gas to a pressurization threshold to thereby achieving a target relative humidity level within the lyophilization chamber, and suddenly releasing pressure within the lyophilization chamber until a depressurization threshold is reached in a short time interval up to about 4 seconds, during the depressurization, product inside one or more vials nucleate.

A lyophilization system for lyophilizing products inside one or more vials within a lyophilization chamber is also disclosed. The system includes a cooling mechanism adapted to cool shelves in the lyophilization chamber, a high pressure source adapted to pressurize the lyophilization chamber, a valve coupled to the lyophilization chamber and adapted to suddenly release pressure within the lyophilization chamber, and a controller. The controller is adapted to cool the shelves in the lyophilization chamber to a predetermined temperature, pressurize the lyophilization chamber with a humidified charge gas to a pressurization threshold to thereby achieving a target relative humidity level within the lyophilization chamber, and suddenly release pressure within the lyophilization chamber until a depressurization threshold is reached in a short time interval up to about 4 seconds, during the depressurization, product inside one or more vials nucleate.

DETAILED DESCRIPTION

Figure 1B:
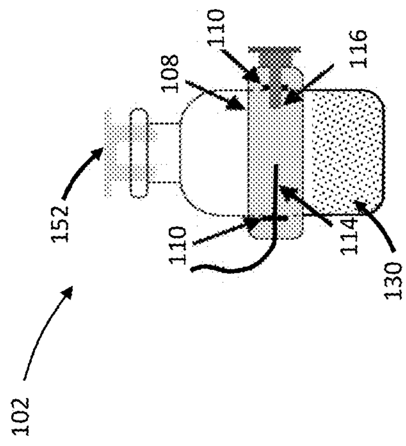
FIG. 1*b* is a front view schematic of a sensor unit of FIG. 1*a* providing additional detail.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

The present disclosure presents an improvement in controlled and rapid depressurization ice nucleation (CIN) process which provides several benefits to the lyophilization cycle including a reduction in primary drying time, more uniform batchwise product quality characteristics and potentially enhanced long-term stability. Application of wireless sensors to the measurement of vial headspace and lyophilization chamber conditions has provided data that can be used to further understand the rapid depressurization CIN (RD-CIN) process. An experimental comparison between nitrogen, argon, and helium ballast gases combined with an isentropic flow model suggest that monatomic gases with low thermal conductivity and molecular mass are the most ideal candidates for optimizing the depressurization process. These ballast gas species produce large temperature drops during RD-CIN event and generate lower entropy relative to other gases. The effect of the vial volume has also been explored. The data indicate that large volume vials provide the most optimal conditions for primary nucleation due to the larger mass of gas present within the headspace. This behavior is indicated by the correlation between vial volume and headspace temperature reduction.

To produce a cake morphology more favorable for lyophilization, nucleation should be induced simultaneously in all vials at a low degree of supercooling where crystals assume a more dendritic form with a larger cross section and greater conductance. Controlled Ice Nucleation (CIN) refers to any process used to achieve this objective. Several techniques have been demonstrated in the literature for inducing ice nucleation including "ice fog," vacuum-induced surface freezing (also known as snap freezing), ultrasound, electro-freezing, addition of nucleating agents, quench freezing, and rapid depressurization. The present disclosure is particularly directed to a rapid depressurization method to achieve CIN.

Rapid Depressurization CIN is one of the commercial technologies currently available and relies on the sudden discharge of pressurized inert gas to induce nucleation. Under this method the samples are first supercooled in the pressurized chamber (typically on the order of 15-30 psig). Following equilibration at the target ice nucleation temperature, the ballast is suddenly released to the surrounding atmosphere, leading to a rapid decrease in chamber pressure and gas temperature. The timeframe for this process is on the order of one second at the laboratory scale and extends to a few seconds in manufacturing environments due to increasing chamber volume.

With the advent of Microelectromechanical Systems (MEMS) coupled with recent advances in wireless sensor networks have made the spatially and temporally resolved measurements of gas pressure and temperature in the vicinity of the vials during RD-CIN now possible. This capability is highly desirable as it provides data which is used to better understand the mechanisms affecting ice nucleation performance under different process conditions. One objective of the present disclosure is to describe an integration of wireless sensors into the RD-CIN process as part of the roles of the gas ballast composition and vial size on primary nucleation. It should be noted that while in production practice, such wireless vial sensors may be avoided altogether, inclusion of these sensors during characterization can provide an open-loop control approach to controlling CIN. Thereafter, the present disclosure describes a nucleation mechanism based on global cooling of the chamber gas and condensation and freezing of the water vapor out of the bulk due to cooling from rapid depressurization.

All CIN procedure discussed herein were conducted in a LYOSTAR 3 lyophilizer (SP SCIENTIFIC, Warminster, PA) outfitted with CONTROLYO technology. Nominal 6 cc, 20 cc, and 100 cc Type I glass serum vials (SCHOTT, Lebanon, PA) with 20 mm neck diameter were used. The number of vials for 6 cc, 20 cc, and 100 cc sizes were 111, 52, and 20, respectively. Vials were partially stoppered using two-legged lyophilization style rubber stoppers and coated with a fluoropolymer (DAIKYO SEIKO, Sano, Japan). The upper two shelves of the LYOSTAR 3 were anchored in place against the upper support structure for all tests in order to accommodate the large 100 cc vials. Vials were filled with purified water having a measured resistivity greater than or equal to 18.2 MΩ-cm. Addition of excipients have little influence on the depressurization pressure or temperature profile. Fill volumes for the 6 cc, 20 cc, and 100 cc vials were 2 mL, 5 mL, and 40 mL, respectively. In terms of measured fill height these volumes correspond to 0.7 cm, 1 cm, and 2.7 cm). These volumes were chosen to be representative of common manufacturing fills. Bottled helium and argon (INDIANA OXYGEN, Lafayette, IN) were used (>99.999% purity). Nitrogen ballast was boiled off from the in-house liquid nitrogen supply (LINDE, Lafayette, IN).

All procedure discussed in the present disclosure employed an identical pre-CIN freeze cycle, independent of the vial type or charge gas. Initially, the samples were brought to about 20° C. and held for 28 minutes. Following this equilibration step, the chamber pressure was increased to a setpoint of 28.5 psig using an inert ballast and maintained while shelf temperature was reduced to −8° C. at 1° C./min from the equilibration temperature. Once at the setpoint, the conditions were held for 3 hours to ensure the solution and gas in the chamber are in equilibrium prior to the next step of depressurization. Following the 3-hour soak period, the chamber pressure was released to a setpoint of 2 psig within 1 to 1.6 seconds, depending on the ballast gas. The cycle was then stopped, the chamber opened, and the sensors shut down. Both wireless pressure and gas temperature sensors were deployed in the first two rows of the vial pack.

Wireless gas pressure and temperature sensors were designed and fabricated for the purpose of monitoring the RD-CIN process. The depressurization event is on the order of 1 second, requiring high sampling rates to resolve the gas pressure and temperature with sufficient temporal resolution. Two devices were deployed, one to measure the chamber properties and the other to measure the vial headspace. Both sensors were located within the first two rows of the vial pack relative to the door of the process chamber. Temperature measurements were performed using 40-gauge T-type thermocouples (OMEGA ENGINEERING, Norwalk, CT). High-gauge lead wires were selected to minimize thermal mass and lead conduction. The thermocouple readings were validation in an ultra-pure frozen water ice bath prior to testing and displayed an average temperature of −0.06° C.+/−0.13° C. The amplifiers were electronically cold-junction compensated to resist fluctuations in ambient temperature.

The favorable response time of MEMS diaphragm-based sensors (HONEYWELL, Charlotte, NC) made them ideally suited for pressure measurement during RD-CIN. Chamber and headspace measurements were performed by absolute and gauge type transducers, respectively. Prior to the test campaign, the absolute pressure sensor was validated against a NIST-traceable ASHCROFT 2089 test gauge (Stratford, CT) with an accuracy of 0.05% and full-scale range of 60 psig. The LYOSTAR 3 was used as the calibration vessel. The validation was performed by taking the difference between the laboratory and the steady state pressure of the charged chamber. This provides the differential pressure and an ability for direct comparison with the reference gauge. Pressure setpoints of 10, 15, 20, and 28.5 psig were tested, producing errors between the reference and wireless sensor of 0.32%, 0.12%, 0.25%, and 0.14%, respectively. The gauge pressure sensor had a full-scale range of 0.36 psig and resolution of 0.0009 psig as specified in the product datasheet.

Figure 1A:
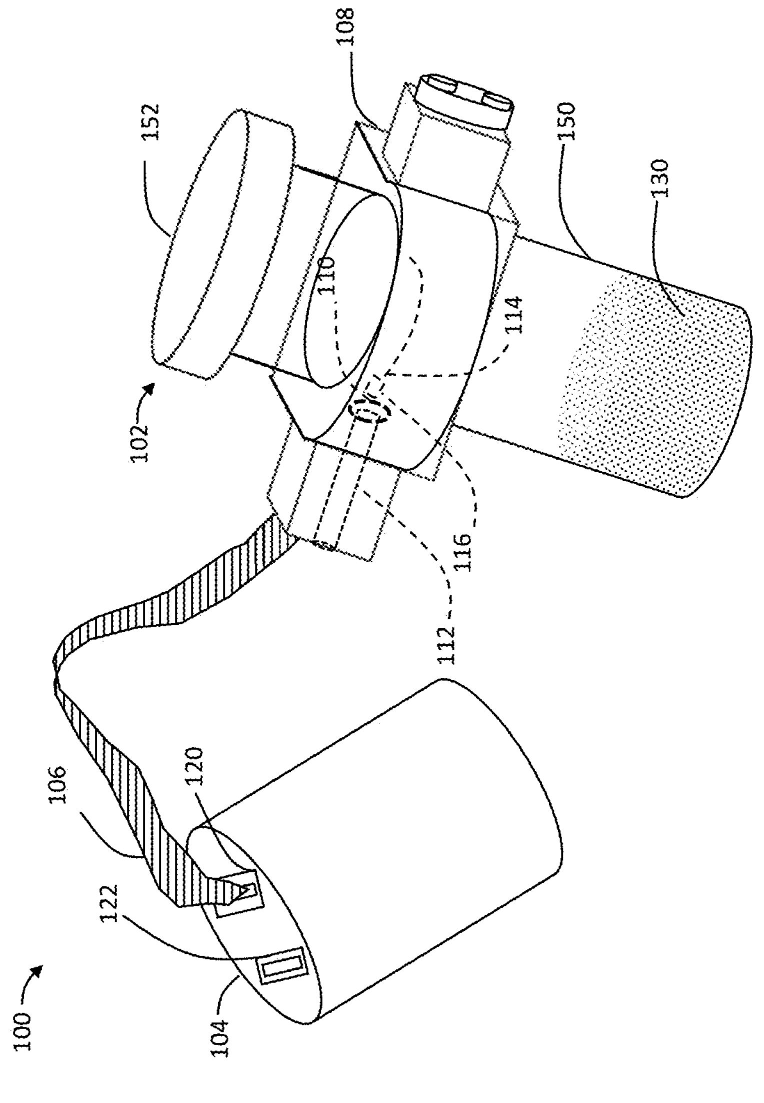
FIG. 1*a* is a perspective schematic view of a wireless gas pressure and temperature sensor system including a sensor unit, according to the present disclosure.
Figure 1C:
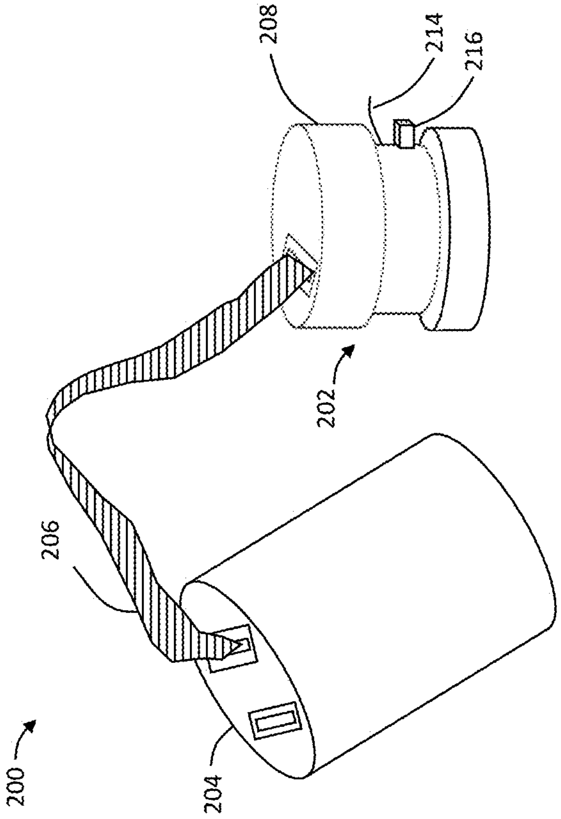
FIG. 1*c* is another perspective schematic view of another wireless gas pressure and temperature sensor system for sensing environmental conditions within a lyophilization chamber.

Referring to FIGS. 1*a*, 1*b*, and 1*c* wireless gas pressure and temperature sensor systems are provided where one is adapted to be placed around a vial in a lyophilization chamber and measure temperature, gauge pressure, and relative humidity in the headspace in the vial (FIGS. 1*a* and 1*b*) and the other is adapted to be placed in the chamber to measure temperature and absolute pressure (FIG. 1*c*).

The wireless gas pressure and temperature sensor systems 100 is shown in FIGS. 1*a* and 1*b*. Specifically, FIG. 1*a* is a perspective schematic view of the wireless gas pressure and temperature sensor systems 100 while FIG. 1*b* is a front view schematic of a sensor unit 102 in additional detail. The wireless gas pressure and temperature sensor systems 100 includes two components a sensor unit 102 and an electronic housing unit 104 (also referred to herein as a reader circuit). The two units (i.e., the sensor unit 102 and the electronic housing unit 104) are coupled to each other via a ribbon cable 106. The sensor unit 102 includes a body 108 adapted to fit on the outside of a vial 150 used in a lyophilization environment and housing material to be lyophilized 130. The body 108 is configured to sealingly couple to the vial 150 using one more O-rings 110 (only one is shown) positioned between the body 108 and the vial 150 and adapted to generate a seal with the vial 150. The vial includes a top 152. The body 108 is in the shape of two c-clamps that are secured around the vial with hardware (not shown) or alternatively in a press-fit manner. The body 108 on one side includes a tubular cavity 112 through which a thermocouple 114, a gauge pressure sensor 116, and a relative humidity sensor (not shown) can be inserted and into the vial 150 through a pre-drilled hole (not shown) into the headspace of the vial (i.e., where there is no product). The gauge pressure sensor 116, the thermocouple 114, and the relative humidity sensor (not shown) are fixed in the headspace and are coupled to an electronic housing 118. The thermocouple 114, the gauge pressure sensor 116, and the relative humidity sensor (not shown) are adapted to measure temperature, pressure, and relative humidity within the vial, respectively, in a non-invasive manner (i.e., the product in the vial is not in contact with the thermocouple 114, the gauge pressure sensor 116, or the relative humidity sensor (not shown)). The electronic housing unit 104 includes circuitry to interface with the thermocouple 114, the gauge pressure sensor 116, and the relative humidity sensor (not shown) in order to 1) power these sensing devices and then read electronic values that can be interpreted as temperature, pressure, and relative humidity correspondingly. The tubular cavity 112 once the sensors have been placed inside the vials 150 can be sealed to provide as minimal of disturbance to the product inside the vial 150.

The electronic housing unit 104 includes electronic interfaces 120 and 122 which provide connectivity either to the ribbon cable 106 or to other instrumentation devices. The electronic housing unit 104 is further adapted to wirelessly communicate information provided by the sensors to a base station (not shown). The wireless protocol and link can be selected from the group consisting of Zigbee, Bluetooth, Wi-Fi, cellular, BLE, Z-wave, Thread, and WiMax.

Similarly, the wireless gas pressure and temperature sensor systems 200, shown in FIG. 1*c*, includes two components a sensor unit 202 and an electronic housing unit 204 (also referred to herein as a reader circuit). The two units (i.e., the sensor unit 202 and the electronic housing unit 204) are coupled to each other via a ribbon cable 206. The sensor unit 202 includes a body 208. On the body 208 there exist a thermocouple 214 and an absolute pressure sensor 216 adapted to measure temperature and pressure within a lyophilization chamber and communicate these variables to the electronic housing unit 204. The electronic housing unit 204 includes circuitry to interface with the thermocouple 214 and the absolute pressure sensor 216 in order to 1) power these sensing devices and then read electronic values that can be interpreted as temperature and pressure, correspondingly. Thereafter, the electronic housing unit 204 is further adapted to wirelessly communicate information provided by the sensors to a base station (not shown). The wireless protocol and link can be selected from the group consisting of Zigbee, Bluetooth, Wi-Fi, cellular, BLE, Z-wave, Thread, and WiMax. The thermocouple 214 and absolute pressure sensor 216 were mounted to a fixture which exposed them directly to the chamber gas.

As discussed above, the wireless gas pressure and temperature sensor systems 100 may not be implemented in production environment. Furthermore, in-chamber relative humidity sensors may also not be available in production environment. In order to establish relative humidity of the chamber, development-phase relative humidity sensors (not shown) may be placed in the chamber. The output of these relative humidity sensors may then be correlated with relative humidity sensors (not shown) in the wireless gas pressure and temperature sensor systems 100 as well as with relative humidity sensors that are provided in-line with charge gas entering the chamber. Therefore, a three-dimensional correlation graph may be generated as a priori data correlating temperature, pressure, and relative humidity of vials to relative humidity of the chamber, to relative humidity of the entering charge gas. In production environment, the relative humidity sensors can be placed within the chamber, or alternatively in-line with the charge gas. Therefore, according to one embodiment, humidity sensors are placed in the lyophilization chamber and a feedback control system is implemented to adjust relative humidity of the charge gas in order to adjust relative humidity of the lyophilization chamber. According to another embodiment, the relative humidity of the chamber is controlled via an open loop control system without relative humidity sensors in the lyophilization chambers based on lyophilization chamber specific parameters.

The sensor unit 102 includes the gauge pressure sensor 110 and a temperature sensing mechanism, e.g., the thermocouple systems 100 and 200 are designed and fabricated for the purpose of monitoring the CIN process. The decompression event is on the order of 1 second, requiring high sampling rates to resolve the gas pressure and temperature with sufficient temporal resolution. The favorable response time of MEMS diaphragm-based pressure sensors make them ideally suited for pressure measurement in this setting. For temperature, 40-gauge T-type thermocouples are selected to minimize thermal mass and lead conduction. Two devices are deployed for all experiments conducted in this study. The first has been designed to measure the headspace properties, outfitted with a differential pressure sensor having a full-scale range of 0.36 psig (sensor unit 102 shown in FIGS. 1*a* and 1*b*). A thermocouple amplifier (not shown) is cold-junction compensated, minimizing the influence of fluctuating circuit board temperatures. All transducers (gauge pressure sensor 116, the thermocouple 114, and the relative humidity sensor (not shown) are affixed to the vial using a 3D printed bracket (shown as the body 108) and sample the headspace via one or more pre-drilled holes drilled in the vial 150 (see FIGS. 1*a* and 1*b*). Holes are formed using a diamond-coated drill bit with heavy water lubrication. Each hole is sealed from the chamber using BUNA rubber O-rings 110 (see FIGS. 1*a* and 1*b*) around the pre-drilled hole of the vial. The second device (see FIG. 1*c*) samples the bulk chamber gas and contains and absolute pressure sensor with a range of 0 to 60 psia. The vial 150 shown in FIGS. 1*a* and 1*b*, can be of different sizes, 20 CC is an example size of the vial 150.

Bluetooth Low Energy (BLE) is chosen as the wireless communication protocol, according to one embodiment; however, as discussed above other wireless protocols are also possible including WiFi, ZigBee, Z-wave, Thread, and cellular. The sampling rates of both pressure and temperature are about 333 Hz, according to one implementation. Upon power-up the devices begin advertising and bond to the central host if discovered. The host will accept connection to the wireless sensors only, rejecting requests from all other BLE-capable devices in the field. On each sampling interval the pressure and temperature data are appended to a 50-byte buffer and transferred out to the host on the a-negotiated connection interval. The host then relays the data packets to the appropriate thread for processing. The data handler thread extracts time-stamped segments from the main buffer and writes them to a file. One data packet from each broadcast is fed to a monitor buffer and is displayed to the user over a custom graphical user interface. The user can activate and deactivate each sensor node from the user interface as well as enable and disable real-time data logging.

The sensor unit 102 includes a pressure transducer, e.g., the gauge pressure sensor 116 and a temperature sensor, i.e., thermocouple 114, while the wireless gas pressure and temperature sensor systems 200 for the chamber includes the absolute pressure sensor 216. Both thermocouples measure temperature using 40-gauge T-type thermocouples. These wireless devices (i.e., the wireless gas pressure and temperature sensor systems 100 and the wireless gas pressure and temperature sensor systems 200) communicate with a central host using the BLUETOOTH LOW ENERGY (BLE) protocol. The electronics modules (i.e., the electronic housing units 104 and 204) containing the batteries, power conditioning, and signal processing hardware) for both wireless devices (i.e., the wireless gas pressure and temperature sensor systems 100 and the wireless gas pressure and temperature sensor systems 200) were encapsulated in 3D printed enclosures. The sensor unit 102 required modification of the vials 150 to sample the headspace while remaining non-invasive to the process. To accommodate this requirement as discussed above, two holes were formed in the vial 150 sidewall using a diamond-coated drill bit. The pressure and temperature transducers discussed above were inserted into these openings and clamped in place using a 3D printed bracket. Both barrel holes were sealed using BUNA rubber O-rings. Both wireless sensor assemblies were placed in the front row of the vial pack during all tests.

BLE was chosen as the wireless communication protocol. The sampling rates of both pressure and temperature are 333 Hz (3 ms sampling interval), providing several hundred measurements throughout the depressurization period. Upon power-up the devices begin advertising and bond to the central host if it is discovered. The host will accept connection to the wireless sensors only, rejecting requests from all other BLE-capable devices in the field. On each sampling interval the pressure and temperature data are appended to a 50-byte buffer and transferred out to the host on the pre-negotiated connection interval. The host then relays the data packets to the appropriate thread for processing. The data handler thread extracts time-stamped segments from the main buffer and writes them to a file. One data packet from each broadcast is fed to a monitor buffer and is displayed to the user over a custom graphical user interface. The user can activate and deactivate each sensor node from the user interface as well as enable and disable real-time data logging.

The factory-insulated LYOSTAR 3 chamber undergoing fast depressurization (on the order of 1 to 2 seconds) allows the RD-CIN process to be modeled as adiabatic (i.e., a thermodynamic process in which no heat or mass is transferred between a system under test and its surroundings). Under this scenario, the charge gas exchanges no heat with its surroundings (i.e. the walls of the process chamber and vials), allowing its temperature to vary in response to changes in pressure. A schematic of the model domain and relevant nomenclature are provided in FIG. 2, which is a schematic of a chamber used to model isentropic discharge during CIN. The CIN valve is modeled as an orifice and assumes no viscos losses. Stagnation pressure and temperature, exit pressure, volume, and composition are all assumed constant. The isolation valve remains closed throughout the entire process. Further assuming the process is reversible enables application of the isentropic flow relations. In reality, the heat transfer from the chamber components, viscous effects within the RD-CIN valve, and phase change associated with the formation water vapor condensation challenge the validity of this assumption. However, it is still useful for developing analytical description and basic understanding of the process. Under isentropic flow theory, the variation in process variables between an arbitrary point and the stagnation conditions are described by:

$$\frac{p}{p_0} = \left(1 + \frac{\gamma - 1}{2} M^2\right)^{\frac{\gamma}{\gamma - 1}} \tag{1}$$

$$\left(\frac{p}{p_0}\right) = \left(\frac{T}{T_0}\right)^{\frac{\gamma}{\gamma - 1}} = \left(\frac{\rho}{\rho_0}\right)^{\gamma} \tag{2}$$

where p is the gas pressure,

T is temperature,

ρ is density, and

γ is the ratio of heat capacity at constant pressure to the heat capacity at constant volume. The subscript "0" represents the stagnation condition and is defined as the value that a process variables assumes if it is brought to rest adiabatically. Of specific relevance to compressible flow modeling is the demarcation between subsonic and supersonic regimes. At this point, the Mach number assumes a value of unity and defines the critical pressure ratio when applied to equation 1.

$$\frac{p_c}{p_e} = \left(\frac{\gamma + 1}{2}\right)^{\frac{\gamma}{\gamma - 1}} \tag{3}$$

Figure 2:
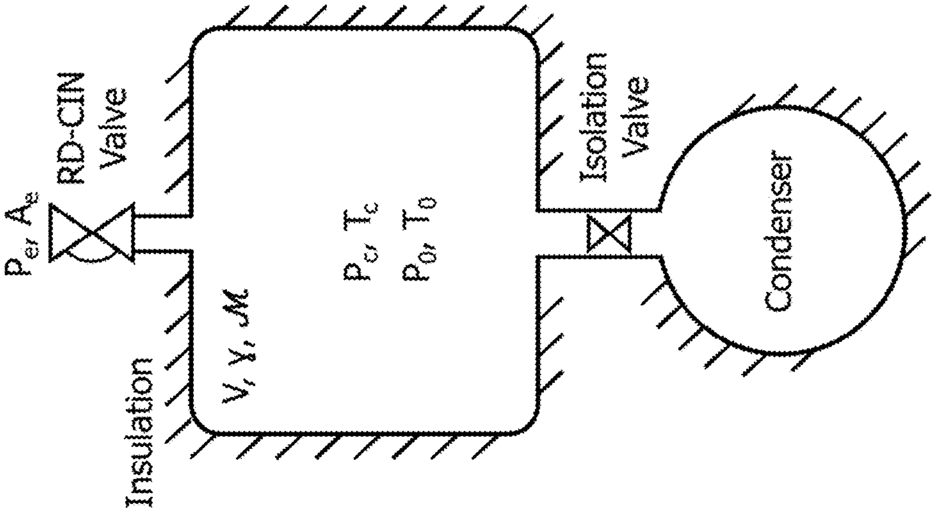
FIG. 2 is a schematic of a model relevant nomenclature of the system of the present disclosure.

Here, the subscripts "c" and "e" denote the chamber and exit (atmospheric) conditions, respectively. When the critical pressure ratio in equation 3 is exceeded the flow is considered choked and achieves sonic velocity in the RD-CIN valve body. For air, γ is about 1.4 and thus the critical pressure ratio is about 1.9. For ratios below the critical value the entire flow becomes subsonic and the chamber conditions are influenced by the ambient properties outside of the lyophilizer. Chamber pressures according to the present disclosure prior to depressurization are on the order of 30 psig and therefore exceed the critical choking ratio for any gas (regardless of γ) during the initial moments of the depressurization. For this reason, both the supersonic and subsonic regimes must be modeled. Applying the principle of mass conservation to the schematic in FIG. 2, provides:

$$V\frac{\partial \rho_c}{\partial t} + \rho_e v_e A_e = 0 \tag{4}$$

where V is the volume of the lyophilization chamber, t is time, v is the velocity, and A is the cross-sectional area of the orifice (duct). The exit velocity is written in terms of the Mach number and speed of sound:

$$v_e = M_e\sqrt{\gamma R T_e} \tag{5}$$

where R is the specific gas constant. Applying the isentropic relations allows the chamber pressure to be expressed as a function of time and the stagnation conditions. In this case, the stagnation pressure and temperature are assumed constant and defined by the steady static pressure and temperature just prior to depressurization. For choked flow, the chamber pressure as a function of discharge time is written explicitly as:

$$p_c(t) = p_0\left(t\frac{A_e}{V}\sqrt{\gamma R T_0}\left(\frac{\gamma + 1}{2}\right)^{\frac{(\gamma+1)}{2(\gamma-1)}}\frac{\gamma - 1}{2} + 1\right)^{\frac{-2\gamma}{\gamma - 1}} \tag{6}$$

As the pressure ratio ($p_c/p_0$) falls below the critical value defined in equation 3 the flow within the RD-CIN valve is no longer sonic. Here, the chamber pressure is not easily solved analytically and is instead left in the differential form:

$$\frac{d(p_c(t)/p_e)}{dt} = -\frac{A_e}{V}\gamma\sqrt{\gamma R T_0}\left(\frac{p_e}{p_0}\right)^{\frac{\gamma-1}{2\gamma}}\sqrt{\frac{2}{\gamma - 1}\left(\left(\frac{p_c(t)}{p_e}\right)^{\frac{\gamma-1}{\gamma}} - 1\right)} \tag{7}$$

Chamber pressure for the subsonic compressible flow was calculated using a $4^{th}$ order RUNGE-KUTTA method with initial conditions set by equation 6 at the time the critical pressure ratio is reached. Equations 6 and 7 are therefore coupled to describe the complete depressurization cycle. Under the isentropic assumption the gas temperature is then estimated from equation 2 using the computed chamber pressure at any point during the depressurization.

$$T_c(t) = T_0\left(\frac{p_c(t)}{p_0}\right)^{\frac{\gamma-1}{\gamma}} \tag{8}$$

Figure 3:
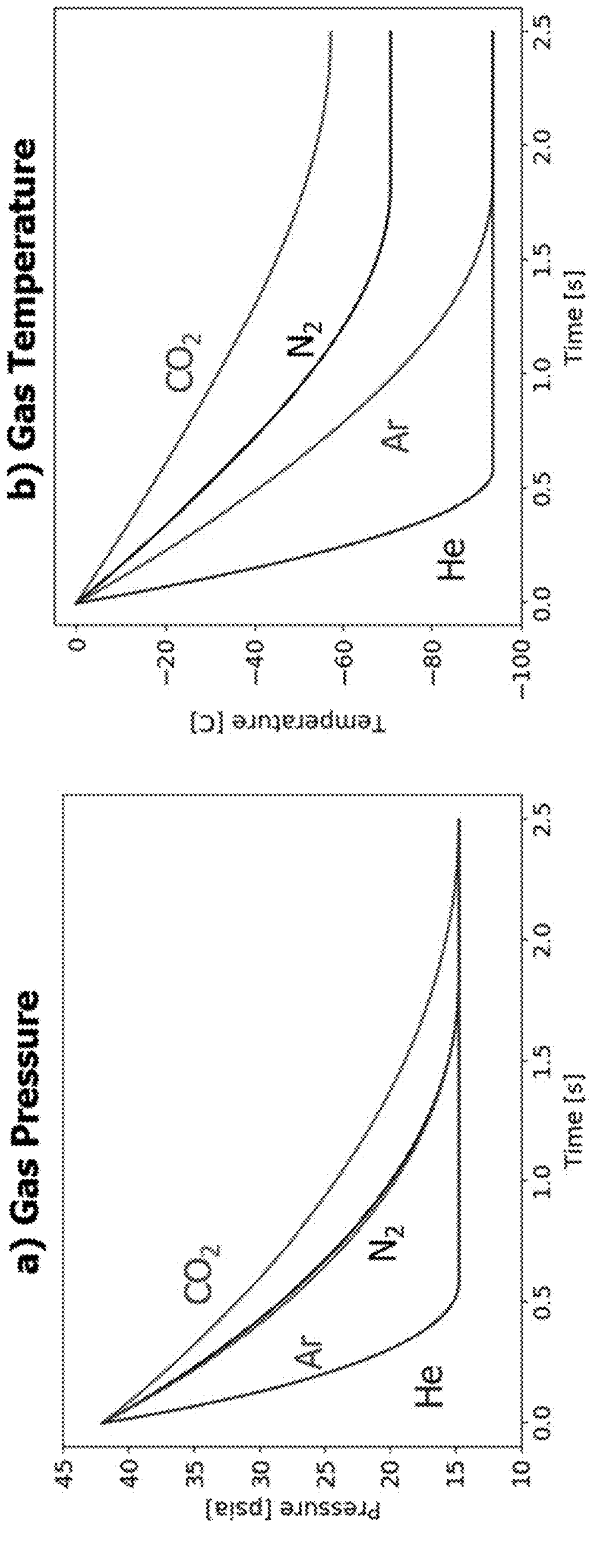
FIG. 3 are plots of the theoretical pressure and temperature distributions for different gases over a depressurization cycle.

Plots of the theoretical pressure and temperature distributions for different gases over a depressurization cycle using equations 6 and 7 are provided in FIG. 3. Solution to equations 6, 7, and 8 for chamber pressure (a) and temperature (b) using nitrogen, argon, helium, and carbon dioxide are thus shown in FIG. 3. In all cases the initial stagnation pressure is 43 psia and the exit pressure is standard atmosphere. Species with largest specific heat ratios attain the lowest temperature during CIN and those with the lowest mass demonstrate the most rapid depressurization. It is worth noting that the effective valve orifice area, $A_e$, in equations 6 and 7 is expected to vary with charge gas due to differences in viscosity (flow resistance in the plumbing). This will ultimately introduce additional gas dependence into the relations. Theoretically, species with largest specific heat ratios attain the lowest temperature during CIN and those with the lowest mass produce the most rapid depressurization. Nevertheless, the data from FIG. 3 can be interpreted to form a qualitative understanding of the effects of the charge gas.

Equations 6, 7, and 8 illustrate the influence of various parameters on the discharge. From a theoretical perspective, increasing initial charge pressure and valve cross sectional area and/or lowering initial gas temperature, chamber volume, and heat capacity ratio will all lead to conditions which increase depressurization rate and better support the isentropic assumption. In practical applications, geometric parameters such as chamber volume and valve dimensions are fixed and the charge temperature is limited by the desire to induce nucleation at a low degree of supercooling. Therefore, as a first step towards optimizing the process, adjustment of either the charge pressure or gas composition is suggested.

A series of RD-CIN procedure were conducted for the purpose of quantifying flow characteristics in the lyophilization chamber and within the headspace and comparing results to the isentropic model. Each vial type was tested using both nitrogen and helium ballast. The 20 cc vial was also tested with argon.

Figure 4A:
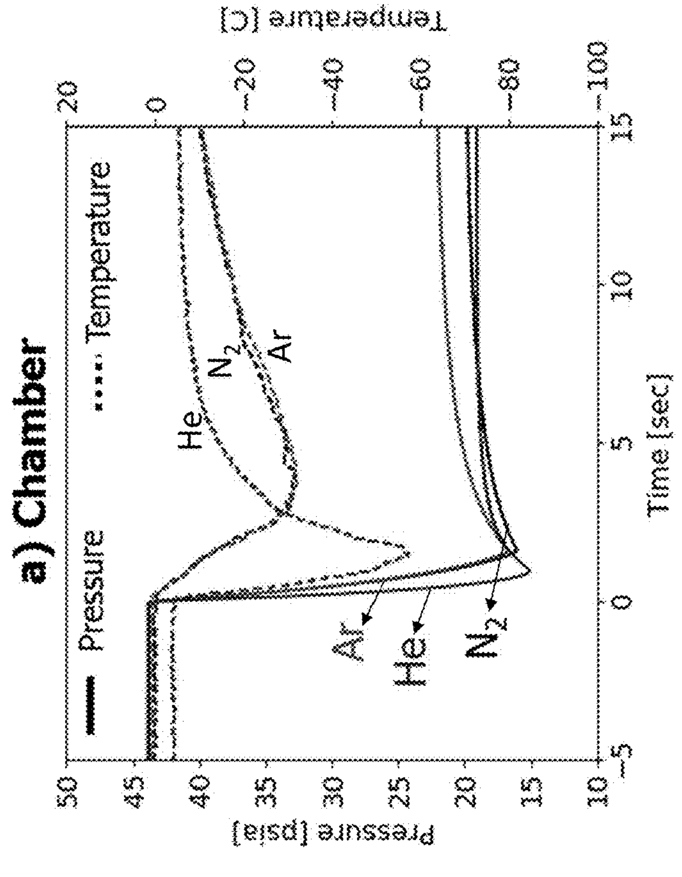
FIGS. 4A and 4*b* are plots of pressure and temperature vs. time for experimental data for different ballast gases in a 20 cc vial in which a comparison of measured gas pressure and temperature in the chamber (FIG. 4*a*) and vial headspace (FIG. 4*b*) during rapid depressurization controlled ice nucleation (RD-CIN) process using nitrogen, argon, and helium in 20 cc vials are provided.
Figure 4B:
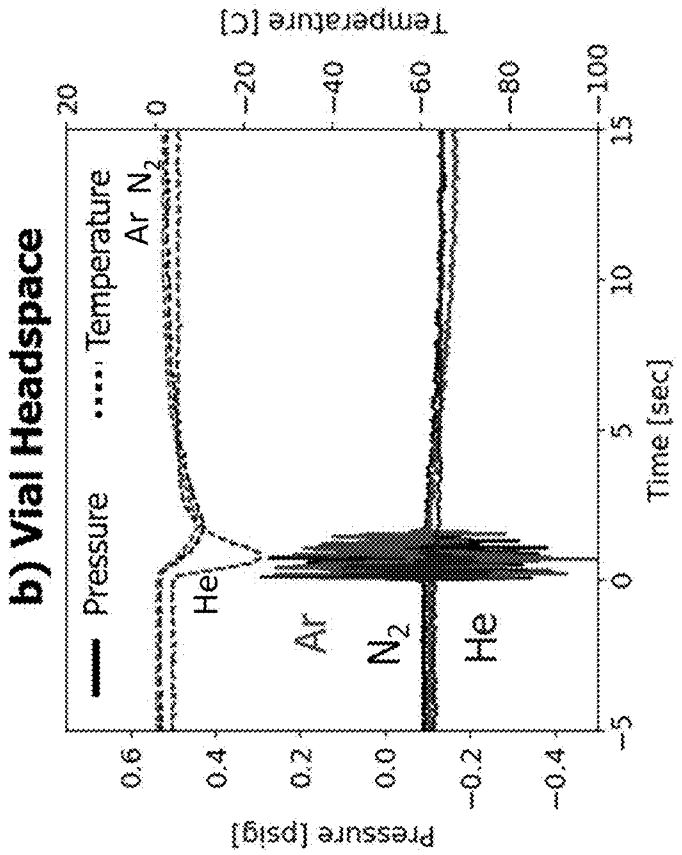

The experimental data for different ballast gases in the 20 cc vial are shown in FIGS. 4*a* and 4*b* in which a comparison of measured gas pressure and temperature in chamber (a) and vial headspace (b) during RD-CIN process using nitrogen, argon, and helium in 20 cc vials are shown. Helium depressurization rate is most rapid and produces the greatest measured drop in temperature. Headspace temperature falls roughly 30% of the magnitude seen in the chamber. No average differential pressure is seen between the vial headspace and the chamber. Complete nucleation was achieved in all vials across all tests. The lower temperature measured in both the chamber and the headspace for helium prior to depressurization is due to its high thermal conductivity, allowing it to more effectively transfer heat from the cool shelf to the thermocouples. This explanation is also supported by the slightly lower measured temperature when using nitrogen as opposed to argon. In terms of pressure, the helium discharge is most rapid, a result that agrees with the isentropic predictions in FIG. 3. Argon and nitrogen exhibit similar depressurization rates, taking around 1.6 times longer than helium to complete. Here, the depressurization time is based on absolute (chamber) pressure and is taken as the time between the valve opening and the minimum measured pressure. After RD-CIN valve closure, the pressure rises by roughly 5 to 7 psi depending on the gas. The recovery action is due to the gradual warming of gas back to its initial state in the sealed chamber as a result of the heat transfer from the chamber walls, vials, shelves, and supporting structure. Helium exhibits the fastest recovery due to its large thermal diffusivity. The vial headspace pressure data in FIG. 4*b* is moving average-filtered with a window of 15 samples to reduce noise. The data exhibit large oscillations during the depressurization and the average pressure is nearly zero for all species. This behavior is due to turbulence, mechanical vibration, diaphragm resonance or a combination of all three. This conclusion is supported by the uniform spectrum below 166 Hz when evaluating the spectral components via Fast Fourier Transform (FFT). Common resonant frequencies for MEMS diaphragms are on the order of 10 kHz (30 times greater than the sampling rate) and are therefore inaccessible to a spectral analysis due to the Nyquist criterion. Regardless, these fluctuations are minimal relative to the bulk chamber pressure and can effectively be neglected.

Figure 5:
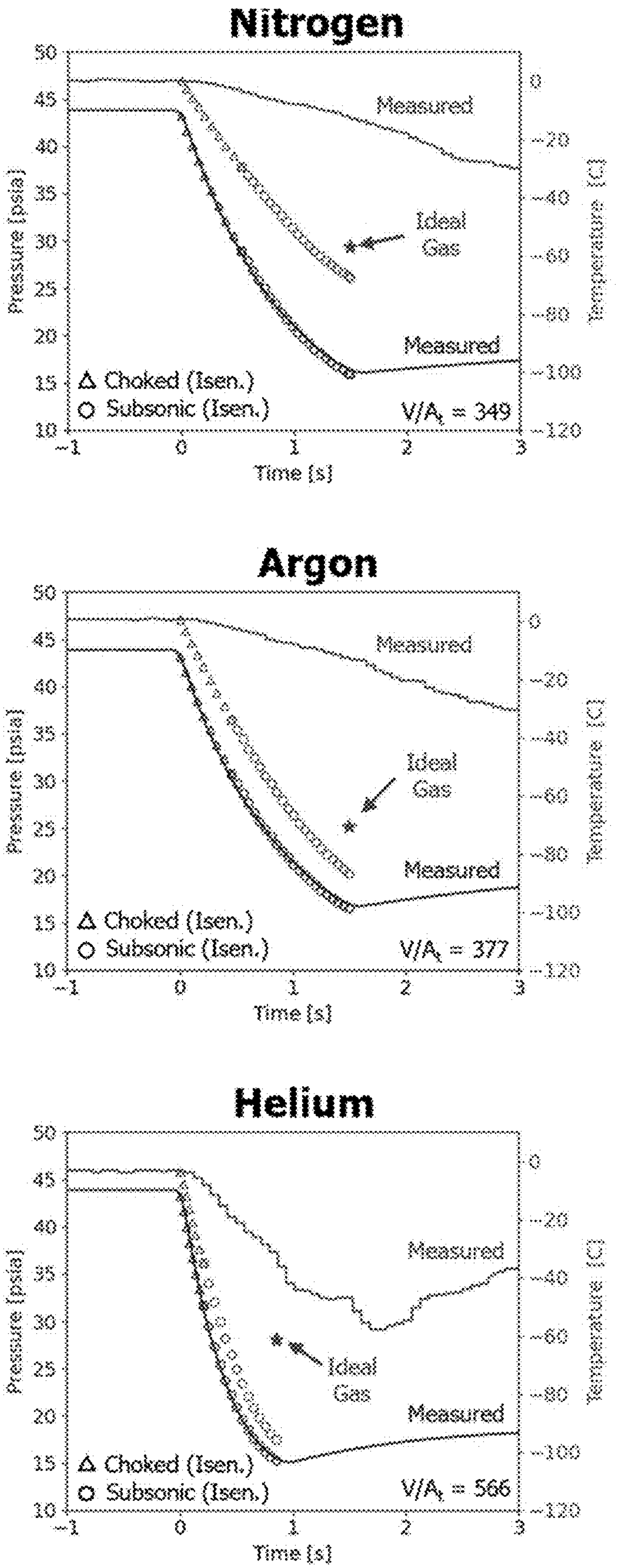
FIG. 5 are plots providing comparison of the measured and estimated pressure and temperature during depressurization, wherein comparison of isentropic model and experimental data using optimal $V/A_e$ ratio for nitrogen, argon, and helium gases are provided.

The isentropic model equations are applied to the experimental data and the chamber volume to RD-CIN valve throat area, $V/A_e$, is used as the fitting parameter. The optimal ratio is solved using a univariate minimization technique, taking the mean-square error between model and pressure data during the discharge as the cost function. Optimal $V/A_e$ values for nitrogen, argon, and helium are 349, 377, and 566 m, respectively. The scatter in the geometric parameter between gases is attributed to the viscous losses within the RD-CIN valve body. The isentropic model in equations 6 and 7 are derived assuming an ideal orifice flow, however in reality the RD-CIN valve is a finite length tube with an unknown series of bends or obstructions that both impart viscous losses to and remove kinetic energy from the fluid. Combined, these effects produce a departure from the isentropic assumption in the RD-CIN valve region, resulting in the observed gas dependence. In other words, a change in composition or discharge rate will make the valve more or less restrictive and will have the same effect as a changing the exit orifice area if the flow were purely inviscid. Following the fitting process, the experimental pressure data show good agreement to the fitted isentropic model. A comparison of the measured and estimated pressure and temperature during depressurization is shown in FIG. 5, wherein comparison of isentropic model and experimental data using optimal $V/A_e$ ratio for nitrogen, argon, and helium gases. RMS error between model and experimental data is the cost function. All data are measured in a 20 cc vial. Both choked and subsonic flow regimes are indicated. The discrepancy in predicted and measured gas temperature results from the thermal mass of the thermocouple. The estimated true gas temperature at the end of depressurization is determined using the ideal gas law. Predictions indicate that argon achieves the lowest temperature magnitude. Parameters used in the model equations 6, 7, and 8 are provided in Table 1. In terms of RMS error, the deviation is 0.267, 0.316, and 0.336 psi over the duration of the discharge for nitrogen, argon, and helium, respectively.

Table 1 provides parameters that are used to compute $V/A_e$ ratio based on the isentropic discharge model and data provided in FIG. 5. The low stagnation temperature of helium is due its comparatively high thermal conductivity. $V/A_e$ is determined using a univariate minimization scheme.

TABLE 1

| Parameters used in FIG. 5. | | | | | | |
|---|---|---|---|---|---|---|
| | Input Parameters | | | | | Best Fit Value |
| Gas | Y | R [J/kg-K] | $P_e$ [psia] | $P_0$ [psia] | $T_0$ [C.] | $V/A_e$ [m] |
| Nitrogen | 1.4 | 296.9 | 14.7 | 43.2 | 0.18 | 349 |
| Argon | 1.66 | 207.9 | 14.7 | 43.1 | 0.68 | 377 |
| Helium | 1.66 | 2078.6 | 14.7 | 43.3 | −3.46 | 566 |

The isentropic theory in equation 3 predicts a direct correlation from gas pressure to temperature. However, a time lag between these measurements is observed in all cases. This time lag is defined as the span between the locations of minimum pressure and temperature during a discharge event. The adiabatic cooling effect must cease at valve closure (minimum pressure) but the measured temperature continues to decrease beyond this point. In all cases the minimum temperature is achieved later than the minimum pressure, indicating the gas is cooler than what is measured both during and for a short time after depressurization. Therefore, it can be assumed that the cause of the disagreement between measurements and theory is due to the thermal inertia of the thermocouple. This conclusion can also be reached through application of the ideal gas law. At the time of valve closure the density of the gas in the chamber becomes constant. The post-discharge density is computed following equilibration of pressure and temperature around 19 seconds after the valve closure (not shown in the span of the plot data). Based on estimates of partial pressure, the mass of the water vapor in the gas is negligible relative to the charge gas (estimated to have a theoretical maximum of 0.4% w/w at the end of depressurization based on considerations of saturated vapor pressure) and is therefore ignored. With density and pressure known, the temperature of the gas in the chamber is computed at the time of valve closure. The estimated minimum temperatures for nitrogen, argon, and helium are −56.9° C., −70.6° C., and −61.2° C., respectively. These values are indicated in FIG. 5 by the "Ideal Gas" markers and indicate that the actual gas temperature lies between the isentropic solution and that measured by the thermocouple at the conclusion of the depressurization event.

Comparison of the relative magnitudes under ideal gas predications demonstrates that argon achieves the lowest temperature during depressurization. This result is supported by the experimental evidence that argon was more effective than both nitrogen and helium at achieving widespread nucleation. This is because the low thermal conductivity of argon relative to the other species. Argon is less effective at wicking heat from the chamber walls, shelf support structure, etc., and therefore better approximates an adiabatic system. This conclusion is also supported by considering the entropy difference between initial and final states. Working with the ideal gas temperatures shown in FIG. 5, argon produces 8.2% and 4.5% of the specific entropy generated by nitrogen and helium, respectively.

Figure 6:
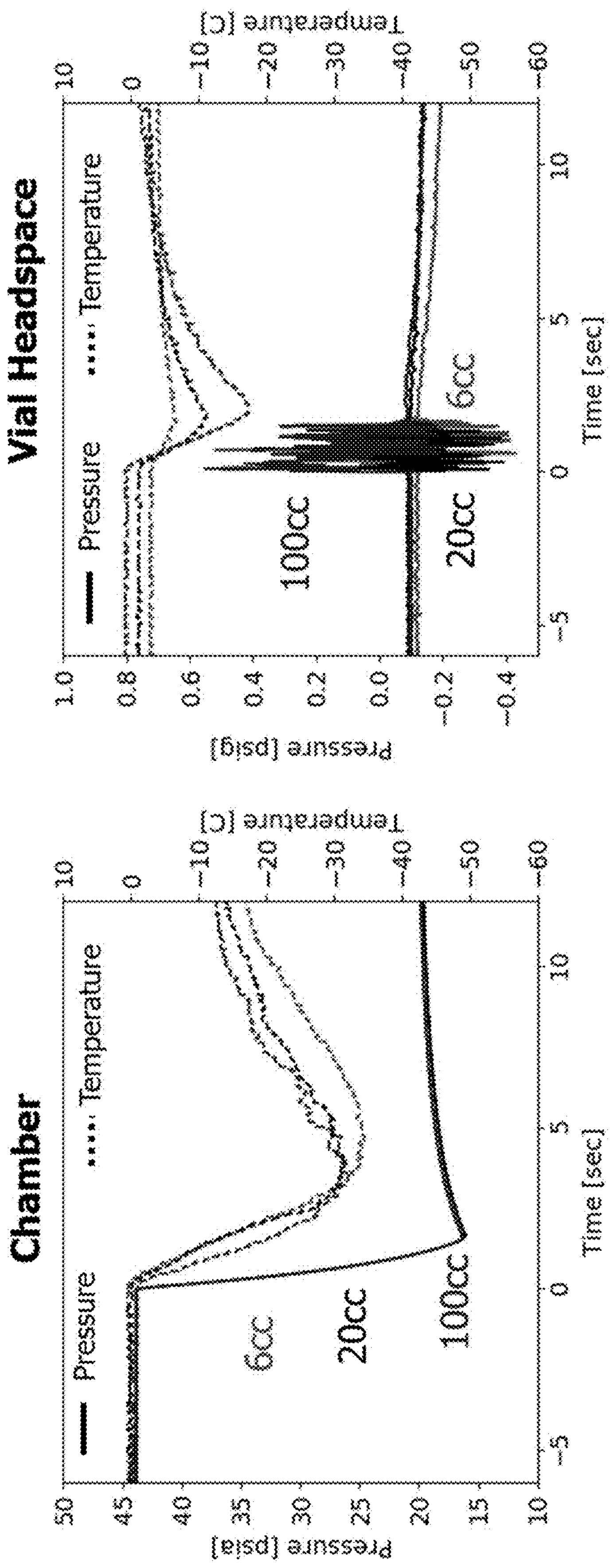
FIG. 6 are plots of pressure and temperature vs. time which provide effect of vial type on gas pressure and temperature in chamber and vial headspace using nitrogen gas ballast.
Figure 7:
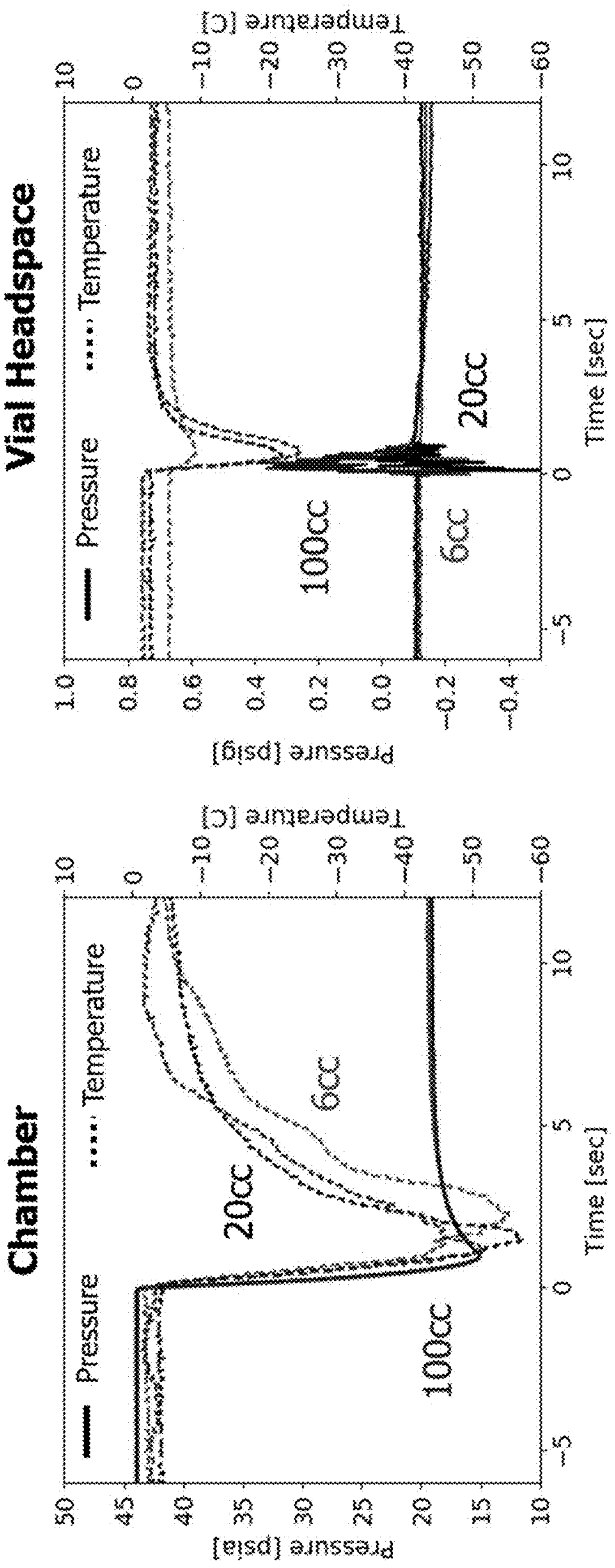
FIG. 7 are plots of pressure and temperature vs. time which provide effect of vial type on gas pressure and temperature in chamber and vial headspace using helium gas ballast.

Comparisons of the measured chamber and headspace pressures and temperature for each vial under nitrogen and helium ballast are shown in FIGS. 6 and 7, respectively. FIG. 6 shows effect of vial type on gas pressure and temperature in chamber and vial headspace using nitrogen gas ballast. Vial size has little effect on the chamber conditions during the discharge event. Larger vials result in a greater temperature drop due to the increased thermal inertia of the headspace gas (larger volume). This result supports the observation that larger vials are easier to nucleate. Additionally, larger vials produce an average pressure drop between headspace and chamber, a behavior that is attributed to the increased volumetric flow rate. FIG. 7 shows effect of vial type on gas pressure and temperature in chamber and vial headspace using helium gas ballast. Similar behavior is observed relative to the nitrogen case however temperature drop magnitudes are greater by around 25% in the headspace and 50% in the chamber. The temperature recovery is much more rapid due to the high thermal conductivity of helium. According to the data, vial type (in the studied range of 6 cc to 100 cc vial size) has no influence on chamber depressurization rate. The 100 cc vial demonstrates a positive average gauge pressure relative to the chamber during depressurization, achieving a magnitude of around 0.2 psig in both cases. This result is supported by the larger vial barrel volume to stopper outlet area ratio (fixed and identical neck size across all vial sizes). From this data it is concluded that flow is subsonic at the stopper vent throughout the entire process, forcing the pressure at this location to be equal to that of the chamber. To meet this condition, the mass flow rate out of the larger volume must be larger than that of the smaller volume. A larger mass flow rate necessitates a greater differential pressure for a given neck size and stopper outlet area, the result of which is observed directly in the figure. Chamber temperature profiles are also independent of vial size during depressurization but some scatter is observed upon valve closure. This behavior is most likely due to convection and radiation from the vials as the chamber gas equilibrates with its surroundings, but additional experiments are required to provide conclusive evidence. Exact thermocouple placement relative to the vials likely plays a major role.

FIG. 6 demonstrates that the smallest vial volume leads to the smallest decrease in headspace temperature. These measurements support the empirical observation that smaller vials are more difficult to nucleate under RD-CIN. One possible explanation for the headspace temperature vial dependence is the heat capacity of the gas. The 6 cc vial necessarily contains a smaller mass of gas just prior to depressurization than the 20 cc or 100 cc vials and therefore has a shorter thermal time constant. Assuming the walls of the borosilicate vials remain at a constant temperature during the discharge it is therefore expected that the temperature of headspace gas in small vials remains at a higher temperature throughout depressurization. It could also be expected that the relative differences in flow rate out of the vials would impart an effect on the temperature drop. However, the flow velocity in the vial is highly dependent on the location and therefore makes a direct comparison difficult. The thermocouple responds much more quickly during helium depressurization due to the higher thermal conductivity and lower temperature magnitude (as indicated in FIG. 5). The temperature recovery following RD-CIN valve closure is also much more rapid for helium, equilibrating around 66% faster than the other species. This behavior further explains the observed departure from an isentropic process as well as the smaller temperature drop during the discharge relative to argon (expected to be identical according to the isentropic theory).

Figure 8:
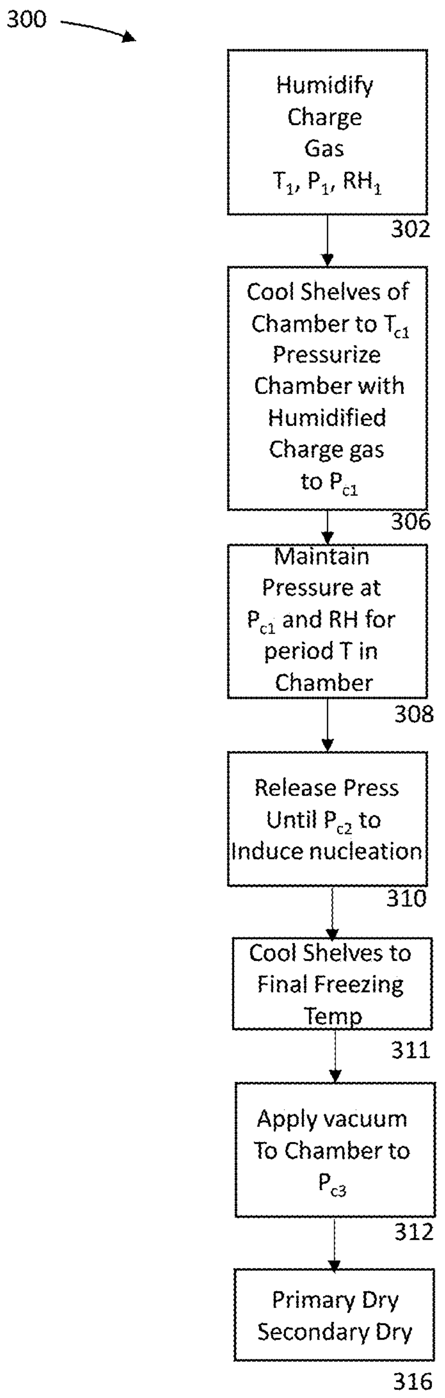
FIG. 8 is a flowchart that provides the steps of the rapid depressurization of the charge gas ($N_2$, $CO_2$, Ar, He) according to the present disclosure associated with improved nucleation.

Referring to FIG. 8, a flowchart is shown that provides the steps of a method 300 for rapid depressurization of the charge gas ($N_2$, air, or various monatomic gases such as Ar and He) according to the present disclosure associated with improved nucleation. As an initial step, a charge gas ($N_2$, air, or various monatomic gases such as Ar and He,) is humidified to a predetermined relative humidity ($RH_1$), pressure ($P_1$), and temperature, ($T_1$) as provided in step 302. Next the shelves in the lyophilization chamber are cooled to a preset temperature $T_{c1}$ until the vial temperatures have stabilized and the chamber is pressurized with the humidified charge gas to a predetermined threshold $P_{c1}$, as provided in step 306. According to one embodiment, $T_{c1}$ is about −20° C. and −2° C., however, the temperature is product-dependent. The chamber is held at this pressure and relative humidity for at least a period of T or until the products in the vials reach a steady state of conditions, as provided by step 308. According to one embodiment, this period is about 4 hours. Next, the pressure is suddenly released through a valve. The ejection of gas can be based on passive release to atmosphere or active release using a vacuum pump or to a vacuum chamber, as provided in step 310. The sudden depressurization continues until a depressurization threshold $P_{c2}$ is reached which is above the pressure outside of the chamber (i.e., higher than atmospheric pressure if being depressurized to atmosphere, or higher than a vacuum pressure if being actively depressurized). According to one embodiment the depressurization threshold $P_{c2}$ is about 1.1 atm. During the sudden depressurization, nucleation is induced, however, due to presence of extra humidity brought on by the humidified charge gas, the nucleation is more robust as will be discussed further below. Next once the nucleation has occurred, the remainder of the steps follows standard lyophilization steps, including cooling the shelves to final freezing temperature, as provided in step 311 and apply a vacuum to the chamber to a pressure of $P_{c3}$, as provided by the optional step 312. According to one embodiment, $P_{c3}$ is about 0.5 atm. Thereafter, the chamber is dried. The drying phase is typically through a primary drying phase followed by a secondary drying phase, as known to a person having ordinary skill in the art, and as provided in step 316.

Figure 9:
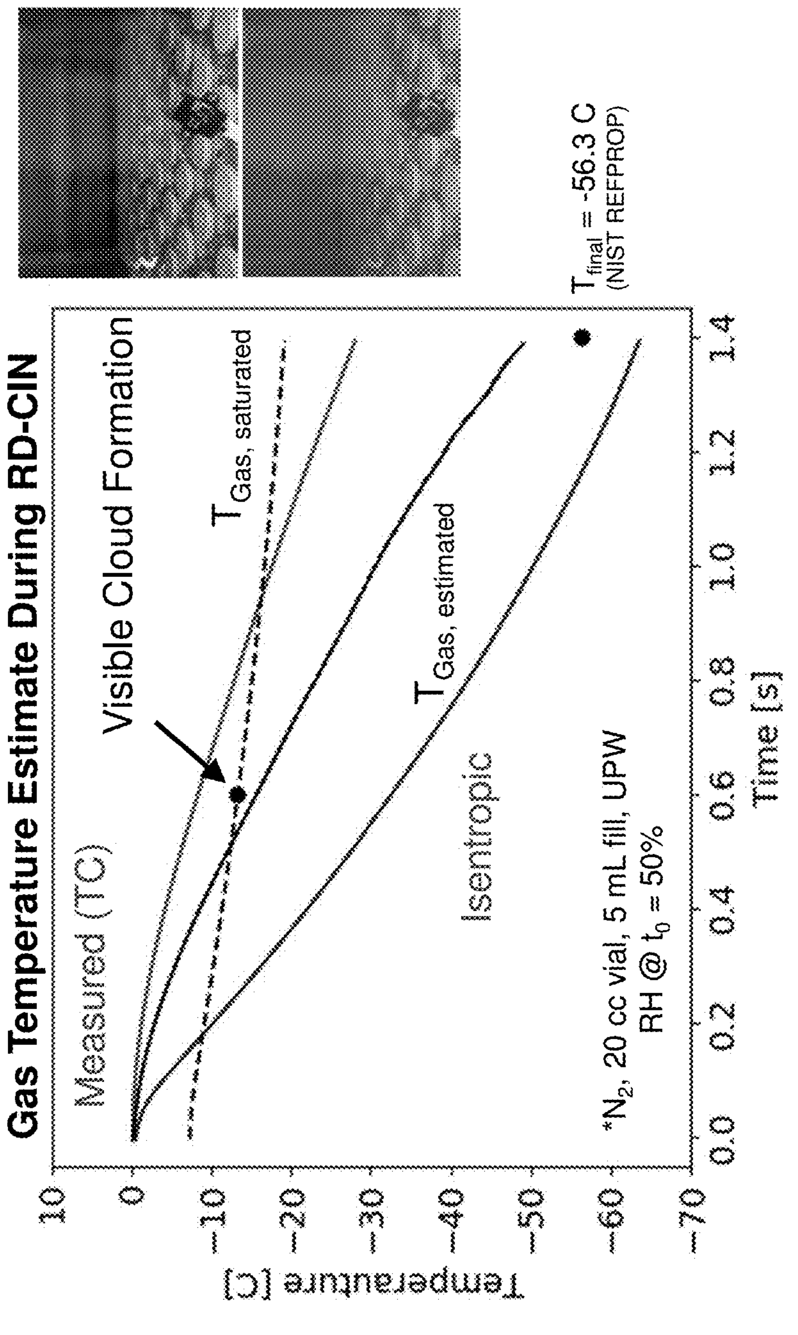
FIG. 9 is a graph of temperature measured in ° C. vs. time measured in seconds providing an estimate of chamber gas temperature using time-dependent mass change.

Referring to FIG. 9, a graph of temperature measured in ° C. vs. time measured in seconds is provided. This graph provides an estimate of chamber gas temperature using time-dependent mass change. Towards this end, one can estimate saturation temperature of water vapor based on instantaneous partial pressure. By inclusion of a relative humidity sensor to determine partial pressure just prior to RD-CIN, an estimated gas temperature crosses saturation line at 0.5 s—where cloud is observed at 0.6 s.

Figure 10:
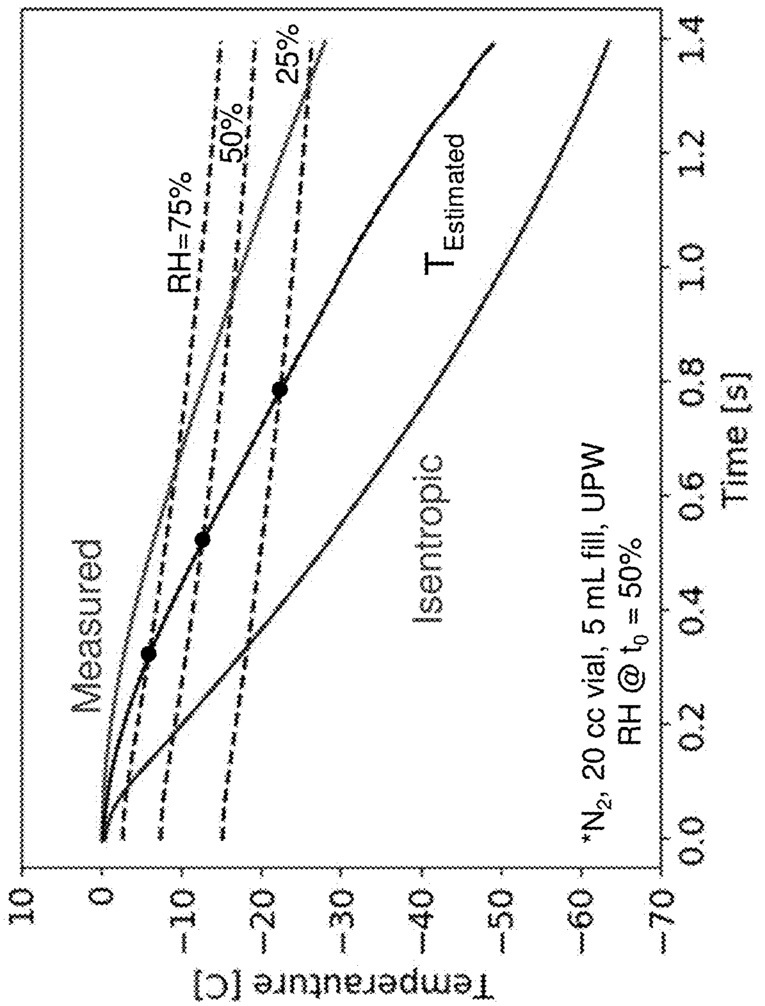
FIG. 10 is another graph of temperature measured in ° C. vs. time measured in seconds showing how increasing humidity in chamber prior to depressurization is more favorable for CIN.

Referring to FIG. 10, another graph of temperature measured in ° C. vs. time measured in seconds is provided. This graph shows increasing humidity in chamber prior to depressurization is more favorable for CIN. It should be noted that lower temperature drop is required to reach saturation. Accordingly, one can adjust humidity in chamber during supercooling phase via external reservoir when measured by a relative humidity (RH) sensor.

Figure 11:
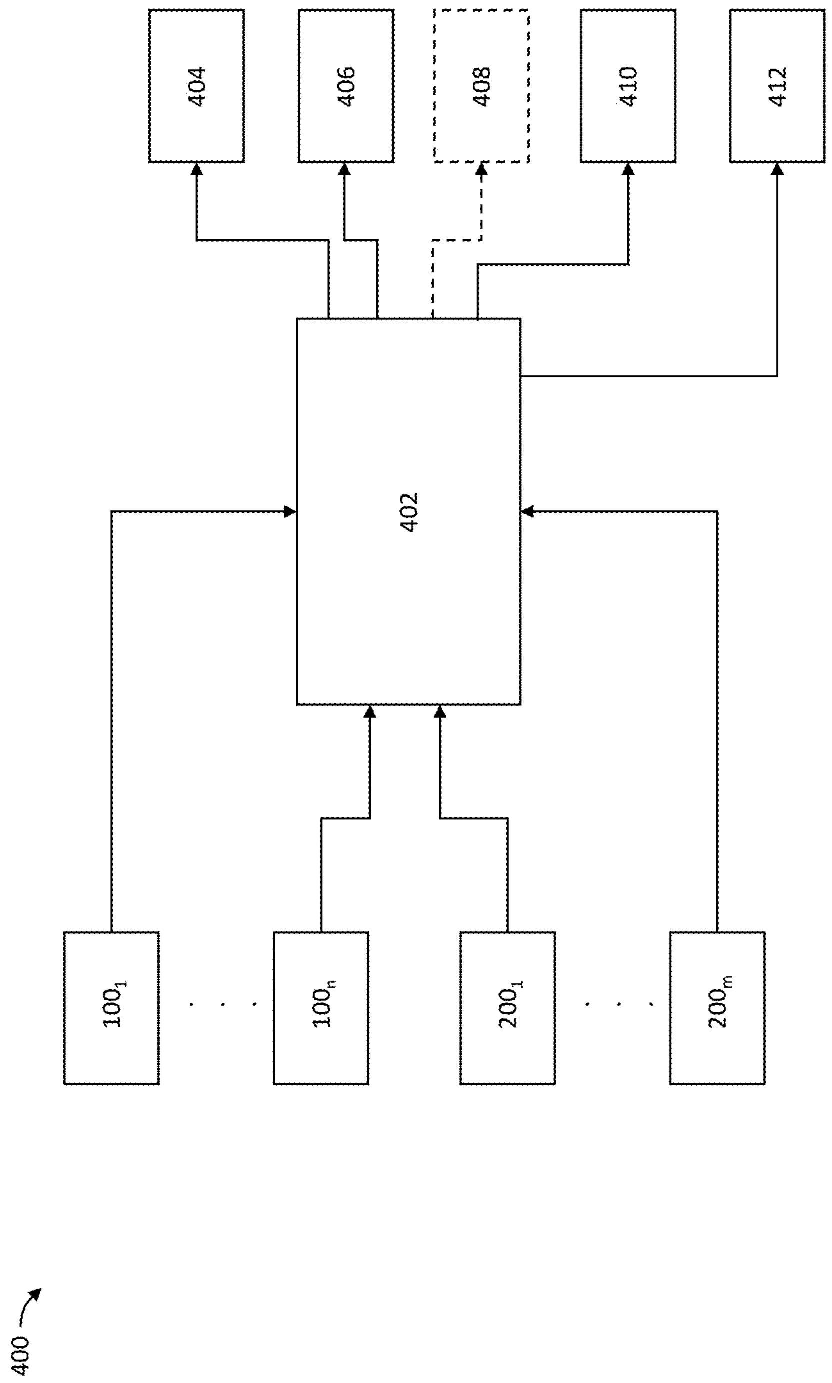
FIG. 11 is a block diagram showing components coupled to a controller responsible for control of a lyophilization chamber, according to the present disclosure.

The operation of the steps outlined in FIG. 8 are carried out by a controller which receives signals from a plurality of wireless gas pressure and temperature sensor systems 100 (see FIG. 1*a*) and one or more wireless gas pressure and temperature sensor systems 200 (see FIG. 1*c*). The controller is adapted to operate various devices (e.g., pumps, and valves) in order to operate the lyophilization system according to the steps shown in FIG. 8. A block diagram 400 is provided in FIG. 11 showing the controller along with these various components. Specifically, the block diagram 400 shows a plurality of wireless gas pressure and temperature sensor systems $\mathbf{100}_1$ to $\mathbf{100}_n$ coupled to a controller 402 providing information about vials including temperature and pressure, as well as a plurality of wireless gas pressure and temperature sensor systems $\mathbf{200}_1$ to $\mathbf{200}_m$ providing information about the chamber, including temperature and pressure. The controller 402 under software control housed in physical memory controls various components such as one or more pressure pumps 404, one or more valves 406, one or more vacuum pumps 408 (shown as optional in relationship to the optional step 312 of FIG. 8), a cooling system 410 (the cooling system is composed of two elements: a low-temperature refrigeration loop with heat exchanger and a heating element), and an ice condensing system 412.

Those having ordinary skill in the art will recognize that numerous modifications can be made to the specific implementations described above. The implementations should not be limited to the particular limitations described. Other implementations may be possible.

The invention claimed is:

1. A lyophilization method for lyophilizing products inside one or more vials within a lyophilization chamber, comprising:

humidifying a charge gas to a predetermined relative humidity, thus generating a humidified charge gas;

cooling shelves in the lyophilization chamber to a predetermined temperature;

pressurizing the chamber with the humidified charge gas to a pressurization threshold to thereby achieving a target relative humidity level within the lyophilization chamber; and during a depressurization, suddenly releasing pressure within the lyophilization chamber until a depressurization threshold is reached in a predetermined amount of time up to about 4 seconds, during the depressurization, product inside one or more vials nucleate, thus leading to lyophilizing products.

2. The method of claim 1, wherein the target relative humidity within the lyophilization chamber is between about 50% to about 100% humidity and the predetermined temperature is below freezing point depression temperature of the lyophilizing products of between about −20° C. and about −2° C.

3. The method of claim 1, wherein the pressurization threshold is between about 1 and about 2 atmosphere above ambient or up to a pressure limit of the lyophilization chamber.

4. The method of claim 1, wherein the predetermined amount of time is sufficiently long to allow stabilization of product temperature and relative humidity with the one or more vials.

5. The method of claim 1, wherein the charge gas is selected from the group consisting of $N_2$, air, and monoatomic gases including Ar, He.

6. The method of claim 1, wherein the sudden release of pressure is passive via a valve to atmosphere.

7. The method of claim 1, wherein the sudden release of pressure is passive via a valve to a vacuum.

8. The method of claim 1, wherein the sudden release of pressure is active via a vacuum pump.

9. The method of claim 1, wherein the target relative humidity level within the lyophilization chamber is achieved by a feedback control topology based on monitoring relative humidity within the lyophilization chamber by one or more humidity sensors disposed in the lyophilization chamber, whereby relative humidity of the charge gas is adjusted to achieve the target relative humidity level within the lyophilization chamber.

10. The method of claim 1, wherein the target relative humidity level within the lyophilization chamber is achieved by an open loop control topology based on parameters associated with the lyophilization chamber, whereby relative humidity of the charge gas is adjusted to achieve the target relative humidity level within the lyophilization chamber.

11. A lyophilization system for lyophilizing products inside one or more vials within a lyophilization chamber, comprising:

a cooling mechanism adapted to cool shelves in the lyophilization chamber;

a high pressure source adapted to pressurize the lyophilization chamber;

a valve coupled to the lyophilization chamber and adapted to suddenly release pressure within the lyophilization chamber; and a controller adapted to:

cool the shelves in the lyophilization chamber to a predetermined temperature;

pressurize the lyophilization chamber with a humidified charge gas to a pressurization threshold to thereby achieving a target relative humidity level within the lyophilization chamber; and during a depressurization, suddenly release pressure within the lyophilization chamber until a depressurization threshold is reached in a predetermined amount of time up to about 4 seconds, during the depressurization, product inside one or more vials nucleate, thus leading to lyophilizing products.

12. The system of claim 11, wherein the target relative humidity within the lyophilization chamber is between about 50% to about 100% humidity and the predetermined temperature is below freezing point depression temperature of the lyophilizing products of between about −20° C. and about −2° C.

13. The system of claim 11, wherein the pressurization threshold is between about 1 and about 2 atmosphere above ambient or up to a pressure limit of the lyophilization chamber.

14. The system of claim 11, wherein the predetermined amount of time is sufficiently long to allow stabilization of product temperature and relative humidity with the one or more vials.

15. The system of claim 11, wherein the charge gas is selected from the group consisting of $N_2$, air, and monoatomic gases including Ar, He.

16. The system of claim 11, wherein the sudden release of pressure is passive via a valve to atmosphere.

17. The system of claim 11, wherein the sudden release of pressure is passive via a valve to a vacuum.

18. The system of claim 11, wherein the sudden release of pressure is active via a vacuum pump.

19. The system of claim 11, wherein the target relative humidity level within the lyophilization chamber is achieved by a feedback control topology based on monitoring relative humidity within the lyophilization chamber by one or more humidity sensors disposed in the lyophilization chamber, whereby relative humidity of the charge gas is adjusted to achieve the target relative humidity level within the lyophilization chamber.

20. The system of claim 11, wherein the target relative humidity level within the lyophilization chamber is achieved by an open loop control topology based on parameters associated with the lyophilization chamber, whereby relative humidity of the charge gas is adjusted to achieve the target relative humidity level within the lyophilization chamber.

* * * * *